Patented Oct. 31, 1933

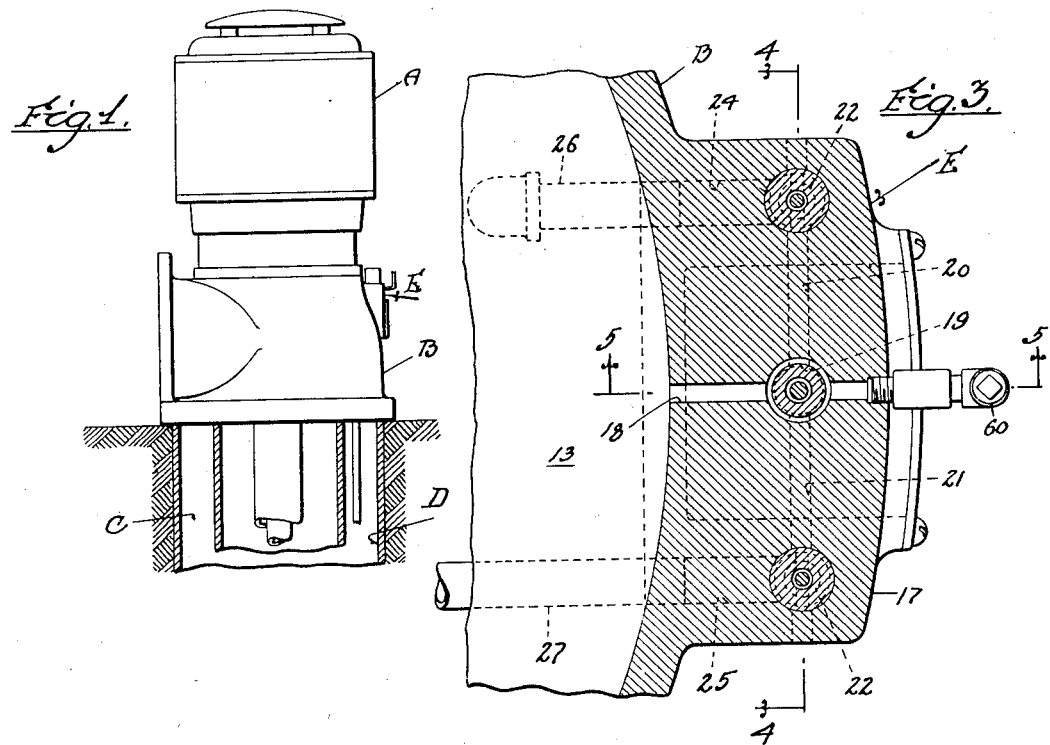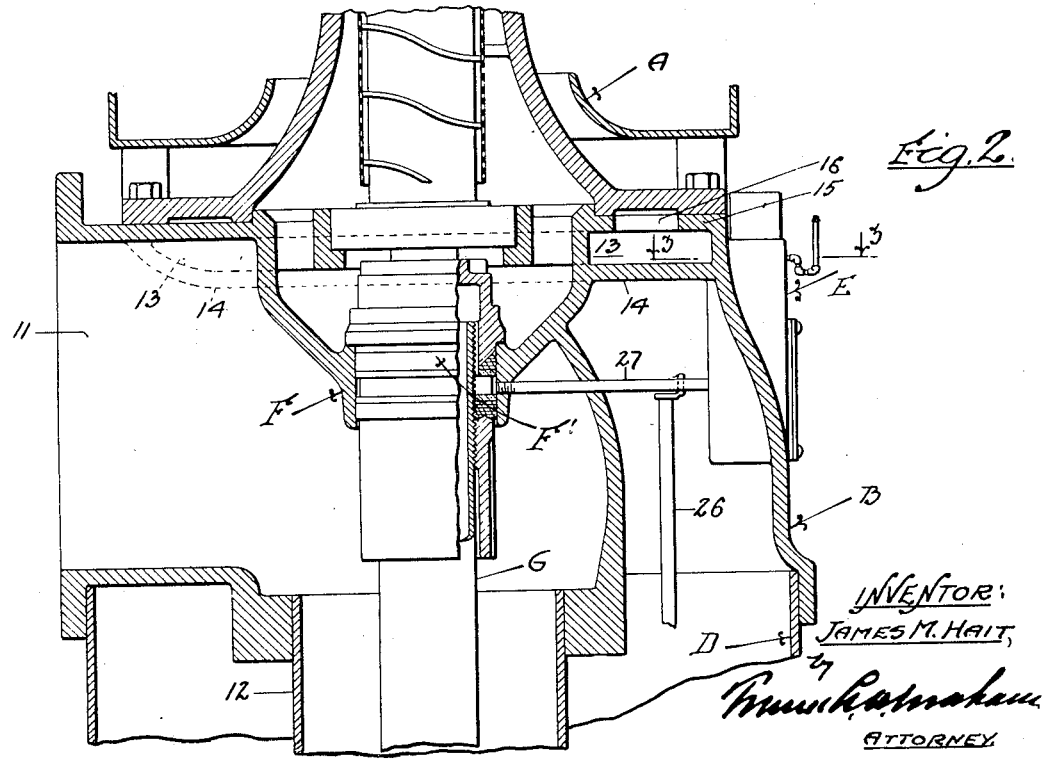

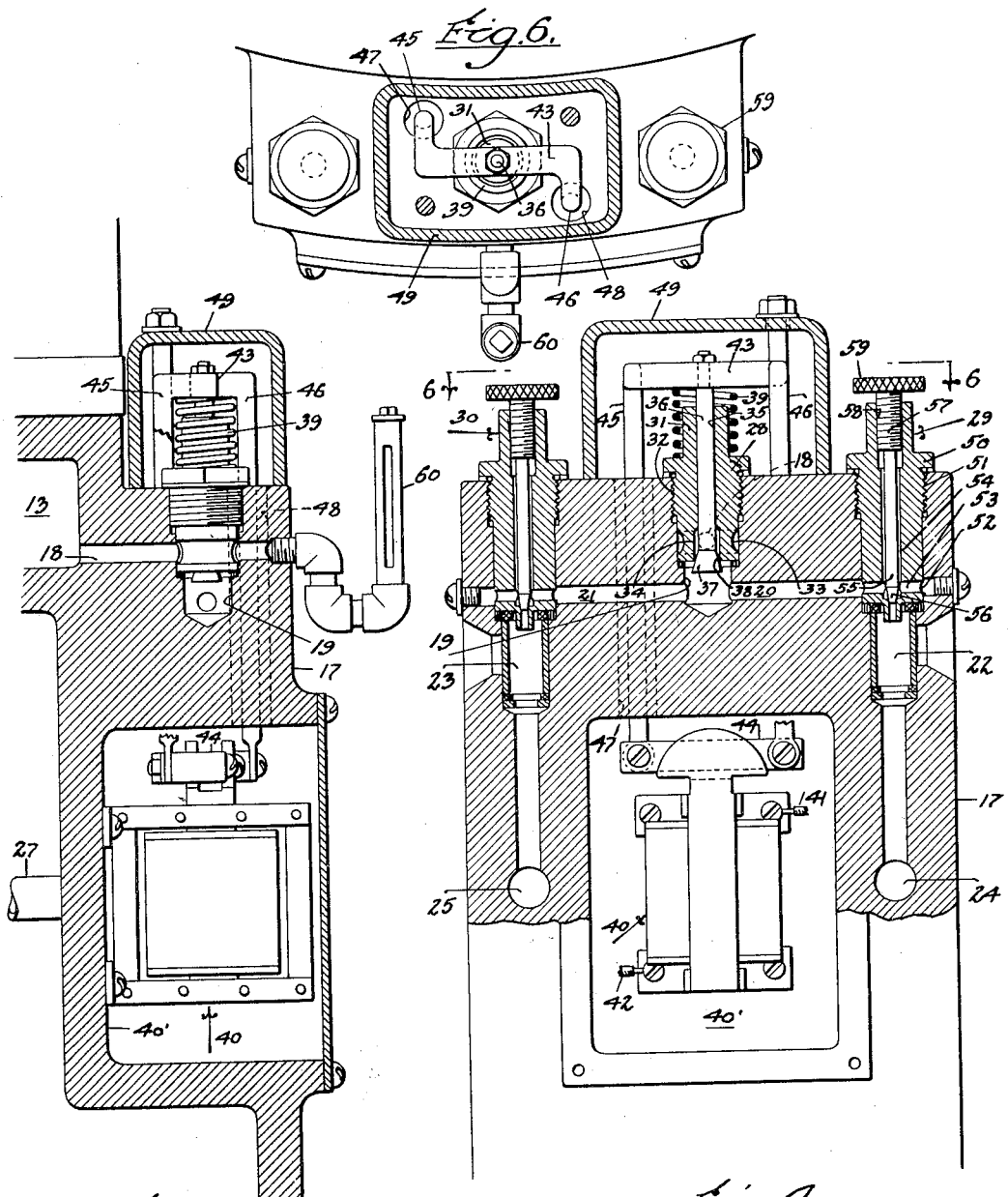

1,932,517

UNITED STATES PATENT OFFICE 1,932,517

DISCHARGE FITTING FOR ROTARY PUMPS WITH WATER-COOLED LUBRICANT RESERVOIR EMBODIED THEREIN

James M. Hait, Bell, Calif., assignor to Food Machinery Corporation, a corporation of Delaware Application February 3, 1931. Serial No. 513,069

4 Claims. (Cl. 184—6)

This invention relates to rotary pumps, and deals particularly with an improvement in the means for lubricating said pumps.

In pumping water from wells by multiple stage rotary pumps of a vertical type, such as is contemplated in this invention, it is essential that bearings throughout the pump receive a constant and a uniform lubrication during the time of operation. Since a pump of this nature embodies several types of bearings, with the bearings located at remote points, considerable difficulty has heretofore been experienced in uniformly lubricating from a single source of supply the bearings on the shaft as it extends into the well, and the bearings in the bowls of the pump, together with the bearing at the bottom of the shaft. In pumps of this nature it is customary to maintain a supply of lubricant in an external reservoir, such reservoirs generally consisting of oil cups mounted above the discharge fitting. This not only exposes the source of supply of lubricant to variations of temperature, due to the climatic conditions, but also provides a structure whereby the oil cups extend away from the discharge fitting, and are subject to breakage.

Due to climatic variations of temperature, the chief difficulty encountered in lubricating those bearings below the discharge fitting has been in maintaining a substantially uniform viscosity of the lubricating medium. In respect to temperature variations, it is known that the viscosity of oils or greases varies with the temperature, and if some means for preventing climatic conditions from affecting the viscosity of the lubricating medium is not provided, the amount of lubricant fed to each bearing will vary according to the weather conditions. This would mean that the amount of lubricant would vary with seasonal changes, and even hot and cold days would affect the amount of lubricant delivered to the bearing, and if the lubricant supply were exposed to the sun the effect would be aggravated. This variation in the feeding of lubricant introduces a serious factor in the operation of pumps of the character described.

In operating such pumps, it is customary to start the pump and leave it in a running condition. If the lubricant, due to hot weather conditions, feeds in excessive amounts, the supply will be prematurely exhausted, and the bearings run dry before the operator has a chance to inspect the pump. In order to overcome this objection, I conceived of maintaining the lubricant supply at a substantially uniform temperature regardless of climatic conditions. I accomplish this by incorporating a lubricant reservoir in the discharge fitting in such a manner that the pumped water flows around the reservoir and maintains the lubricant at substantially the same temperature as the water. In this respect, it is a known fact that water in wells has a substantially uniform temperature at all times, and that, consequently, the temperature of the lubricating medium will be maintained at a substantially uniform temperature regardless of external climatic conditions. Accordingly, it becomes an object of this invention to provide a discharge fitting having a water cooled lubricant reservoir embodied therein in such a manner that the pumped water will maintain the temperature of the lubricant at a substantially uniform temperature.

This invention also embodies means for delivering lubricant from the reservoir to the lower bearings of the pump by gravity, such means of itself possessing novelty, in that the operation is automatic and operates only during the time the pump is running and the parts are arranged in a manner to require no packing glands. In addition, the delivering means is equipped with means for separately adjusting the amount of lubricant fed to each bearing. It is, therefore, another object of this invention to provide, in conjunction with a water-cooled lubricant reservoir, a means for automatically and adjustably feeding said lubricant to the lower bearings of the pump, said means being characterized by having no packing glands therein and being automatically operable only during the time the pump is operating.

Another object of the invention is to provide a discharge fitting for the purpose described, wherein a minimum resistance to water flow is set up. As a means toward this end, I incorporate a curved wall in the fitting, which operates to turn the flowing water outwardly through the discharge opening with a minimum of turbulence. The structure thus formed in reality amounts to an elbow connection between the discharge pipe and the outlet opening.

Other objects and advantages, such as economy of production, ease of installation, elimination of externally protruding parts, etc., will become apparent as the description proceeds in conjunction with the drawings in which—

Fig. 1 is an elevational view partly in section, showing how my discharge fitting would be employed in a pump head;

Fig. 2 is an enlarged fragmentary vertical section of Fig. 1 taken in the plane of the paper showing my discharge fitting incorporated therein;

Fig. 3 is an enlarged section taken on line 3—3 of Fig. 2;

Fig. 4 is a fragmentary view taken on line 4—4 of Fig. 3;

Fig. 5 is a fragmentary view taken on line 5—5 of Fig. 3; and

Fig. 6 is a view taken on line 6—6 of Fig. 4.

Referring to the drawings, and particularly to Fig. 1, I have shown a pump head of conventional design comprising a motor A and a discharge fitting B; the whole being mounted over a well C having a well casing D.

Since my invention is embodied in the discharge fitting B, a detailed description of said fitting will now be entered.

In Fig. 2, I have shown a vertical section of the discharge fitting B. In this view, I have illustrated the fitting B as mounted upon the well casing D, and supporting on the upper side thereof the motor A. The discharge fitting B is provided with the usual discharge orifice 11, and is connected to a regulation discharge pipe 12 which conducts water from the pump in the well to the surface. The fitting B is also formed with a centrally disposed depending housing F' adapted to support a bearing generally designated F".

As before stated, it is an object of this invention to provide a water-cooled lubricant reservoir in the fitting B. For this purpose I form, integral with the fitting B, a lubricant reservoir designated in its entirety 13. I accomplish this by providing an annular wall 14 spaced below the upper wall 15 of the fitting B. For purpose of casting, I form a hole 16 in the upper wall 15.

The foregoing structure will be appreciated as providing an annular space in the upper part of the fitting B forming the reservoir 13, which extends substantially around the upper portion of the fitting and is cooled by water flowing up the discharge pipe 12 and out the discharge opening 11. It is clear that any lubricant contained in the reservoir 13 will be maintained at substantially the same temperature as the water pumped from the well.

As a means of distributing lubricant from the lubricant reservoir 13, I embody in the fitting B a device generally designated E. The details of said device will be best understood by referring to Figs. 3, 4, and 5.

Referring to Fig. 3, I have shown a section of my device which embodies passages, whereby the lubricant may be discharged from the reservoir 13 and may be conducted to any lower part of the pump which requires lubricating. In this view, I have illustrated the device E as comprising a boss of metal 17 integral with the discharge fitting B, and having a lateral passage 18 which connects the lubricant reservoir 13 with a vertical passage 19 in the boss 17. Connecting with the vertical passage 19 and below the lateral passage 18, I form lateral passages 20 and 21 substantially at right angles to passage 18, said passages leading to vertical openings 22 and 23, respectively, in the boss 17.

Leading from the vertical openings 22 and 23, respectively, are lateral passages 24 and 25. Connected to the passages 24 and 25 are lubricant-conducting pipes 26 and 27, respectively, said pipes leading to lower bearings in the pump organization which require lubrication. In this instance, I have shown the pipe 26 as leading downwardly into the well for lubricating bearings in the pump proper, and the pipe 27 as leading directly to the bearing generally designated F' from where it is distributed into the drive shaft protective casing G by the structure illustrated but not described, or in any other well known manner.

As a means of controlling the flow of lubricant from the lubricant reservoir 13, to the lower parts of the pump, I provide valves 28, 29, and 30 in the openings 19, 22, and 23, respectively. The valve 28 comprises a plug 31 screw-threadedly mounted in the upper end of the opening 19 as shown at 32. The lower end of the plug is annularly grooved, as shown at 33, and when seated in the opening 19 the groove 33 registers with the passage 18 and forms a means of allowing lubricant to enter from the passage 18. The plug is further provided with a diametrical opening 34 which connects with the groove 33.

In the vertical central portion of the plug 31, I form a bore 35, and into this bore fit a stem 36 having a valve 37 on the lower end thereof adapted to seat upon the lower end of the plug as shown at 38. The valve is normally held in a closed position by means of a spring 39, and controls the flow of lubricant from the passage 18 through the opening 34. This will be appreciated as a means of closing all flow of lubricant except when the valve is open, and since it is obvious that the valve should be open only during the time the pump is running, I provide means for this purpose.

As a means of opening the valve during the time the pump is operating, I provide a solenoid generally designated 40 mounted in a recess 40' in the block 17, and connect the solenoid with the motor circuit by means of conductors 41 and 42 so that the solenoid becomes active only during the operation of the motor. In order to transmit the movement of the solenoid to open the valve 37, I provide a cross-bar 43 connected to the stem 36 of the valve, and connect said cross-bar to a cross-bar 44 mounted upon the core of the solenoid by links 45 and 46, said links passing through openings 47 and 48, respectively, in the boss 17. A cap 49 may be provided to enclose the valve organization above described. The valves 29 and 30 being identical, a description of one will serve for both; in this instance the valve 29 being described.

The valve 29 comprises a plug 50 mounted in the opening 22 by means of screw-threads shown at 51. The lower end of the plug is provided with an annular groove 52 which coincides with the passage 20 when the plug is seated. A passage 53 through the plug connects the groove 52 with a vertical passage 54. In the passage 54 I mount a stem 55 having a needle valve 56 on the lower end thereof. The upper end of the stem 55 is provided with screw threads 57 adapted to engage a screw-threaded opening 58 in the plug 50.

A thumb nut 59 is provided on the upper end of the stem 55 for adjustment of the valve opening. With this arrangement, it is possible to accurately adjust the needle valve 56 to pass any amount of lubricant required.

In operation, the motor A would be started and the solenoid 40 would act to open the valve 28. The lubricant would then flow into the passages 20 and 21. The valves 29 and 30 could be adjusted to control the flow of lubricant therethrough, depending upon the part of the pump to be lubricated by each valve. The lubricant would then flow through the openings 24 and 25 and into the pipes 26 and 27, respectively, where it would be conducted to pump bearings below. As a means of observing the amount of lubricant in the lubricant reservoir, I provide a gauge 60 connected to the outer end of the passage 18.

Although I have shown and described a specific embodiment of my invention, nevertheless I am aware that modifications may be made therein without departing from the principle involved. I, therefore, reserve the right to all such modifications and refinements which occur in the manufacture and application of my invention as do not depart from the scope of the specification or the essence of the invention as expressed in the appended claims.

I claim as my invention:

1. In a pump of the character described: a discharge fitting having a water-cooled lubricant reservoir embodied therein; a valve for discharging lubricant from said reservoir, said valve being normally closed; a stem on said valve extending above the upper level of lubricant in said reservoir; and means associated with said stem for automatically opening said valve when the pump is operating.

2. In a pump of the character described: a discharge fitting having a water-cooled lubricant reservoir embodied therein; control means for discharging lubricant from said reservoir to parts of said pump, said control means embodying a valve for discharging lubricant from said lubricant reservoir; and additional valves for regulating the flow of lubricant to parts of said pump, and all of said valves having control stems extending above the upper level of the lubricant in said lubricant reservoir.

3. In combination with a pump of the class described having a discharge fitting and shaft bearings below said discharge fitting, means for delivering lubricant to said shaft bearings embodying: a boss on said discharge fitting; a vertical passage in said boss; a plug mounted in the upper end of said vertical passage; a valve stem extending through said plug; a control valve on said stem adapted to seat against the lower end of said plug; yieldable means for holding said valve closed; electrical means for opening said valve; means for delivering lubricant into said plug above said valve; a second vertical passage in said boss; a drip valve in said second passage; means for delivering lubricant from the first vertical passage below the control valve therein to the second passage above the drip valve therein; and conduit means for delivering lubricant from the second passage below the drip valve to said shaft bearings.

4. In combination with a pump of the class described having a discharge fitting and shaft bearings below said discharge fitting, means for delivering lubricant to said shaft bearings embodying: a boss on said discharge fitting; a vertical passage in said boss; a plug mounted in the upper end of said vertical passage; a valve stem extending through said plug; a control valve on said stem adapted to seat against the lower end of said plug; yieldable means for holding said valve closed; electrical means for opening said valve; means including a reservoir formed in said discharge fitting with a wall thereof exposed to the pumped liquid passing therethrough for delivering lubricant into said plug above said valve; a second vertical passage in said boss; a drip valve in said second passage; means for delivering lubricant from the first vertical passage below the control valve therein to the second passage above the drip valve therein; and conduit means for delivering lubricant from the second passage below the drip valve to said shaft bearings.

JAMES M. HAIT.